US011265722B2

(12) United States Patent
Weng et al.

(10) Patent No.: US 11,265,722 B2
(45) Date of Patent: Mar. 1, 2022

(54) PERIPHERAL-FREE SECURE PAIRING PROTOCOL BY RANDOMLY SWITCHING POWER

(71) Applicant: Jinan University, Guangdong (CN)

(72) Inventors: Jian Weng, Guangdong (CN); Zhijian Shao, Guangdong (CN); Yue Zhang, Guangdong (CN); Ming Li, Guangdong (CN); Jiasi Weng, Guangdong (CN); Yongdong Wu, Guangdong (CN); Weiqi Luo, Guangdong (CN)

(73) Assignee: Jinan University, Guangzhou (CN)

( * ) Notice: Subject to any disclaimer, the term of this patent is extended or adjusted under 35 U.S.C. 154(b) by 106 days.

(21) Appl. No.: 16/824,076

(22) Filed: Mar. 19, 2020

(65) Prior Publication Data

US 2021/0297851 A1 Sep. 23, 2021

(51) Int. Cl.
*H04W 12/06* (2021.01)
*H04W 12/55* (2021.01)
*H04W 84/18* (2009.01)
*H04W 12/0433* (2021.01)
*H04W 4/80* (2018.01)
*H04W 4/70* (2018.01)

(52) U.S. Cl.
CPC ....... *H04W 12/55* (2021.01); *H04W 12/0433* (2021.01); *H04W 84/18* (2013.01); *H04W 4/70* (2018.02); *H04W 4/80* (2018.02)

(58) Field of Classification Search
CPC combination set(s) only.
See application file for complete search history.

(56) References Cited

U.S. PATENT DOCUMENTS

| 2008/0055069 A1* | 3/2008 | Aiki | H04W 52/029 340/539.3 |
| 2008/0309481 A1* | 12/2008 | Tanaka | A61B 5/0002 340/539.12 |
| 2011/0075685 A1* | 3/2011 | Xu | H04L 27/2672 370/503 |

(Continued)

OTHER PUBLICATIONS

M. B. Barcena and C.Wueest, "Insecurity in the internet of things," Security Response, Symantec, 2015.

(Continued)

*Primary Examiner* — Cindy Trandai

(57) ABSTRACT

A method for pairing a plurality of devices in the context of internet of things (IoT), including: connecting power supplies of the plurality of devices to a same power source, wherein the plurality of devices includes an initiator device and a responder device; synchronizing clocks of the initiator device and the responder device; switching the power source off and on for a plurality of times n; recording time stamps $S(T)=\{T1, T2, T3, \ldots T_n\}$ corresponding to time stamps when the initiator device and the responder device switch off in response to switching off of the power source; and performing the pairing of the initiator device and the responder device if each of the initiator device time stamps is within a predefined delay tolerance of a corresponding time stamp of the responder device time stamps, otherwise rejecting the pairing of the initiator device and the responder device.

18 Claims, 7 Drawing Sheets

(56) References Cited

U.S. PATENT DOCUMENTS

| | | | | |
|---|---|---|---|---|
| 2011/0197262 | A1* | 8/2011 | Tsukidate | H04L 63/1441 726/3 |
| 2012/0310800 | A1* | 12/2012 | Xia | H04W 4/80 705/34 |
| 2013/0342131 | A1* | 12/2013 | Recker | H02J 50/40 315/292 |
| 2014/0328356 | A1* | 11/2014 | Cachin | H04J 3/065 370/509 |
| 2015/0009878 | A1* | 1/2015 | Kim | H04W 4/70 370/311 |
| 2015/0296599 | A1* | 10/2015 | Recker | H05B 47/16 315/153 |
| 2015/0302892 | A1* | 10/2015 | Ojanpera | G11B 27/10 700/94 |
| 2017/0148018 | A1* | 5/2017 | Levin | H04W 12/04 |
| 2018/0054509 | A1* | 2/2018 | Nuescheler | G06F 3/017 |
| 2018/0121861 | A1* | 5/2018 | Morgenthau | H04W 4/025 |
| 2018/0133583 | A1* | 5/2018 | Tran | A63B 24/0075 |
| 2018/0176079 | A1* | 6/2018 | Teo | H04W 76/15 |
| 2018/0249310 | A1* | 8/2018 | Kim | H04W 76/19 |
| 2019/0380394 | A1* | 12/2019 | Takeuchi | H02J 7/0068 |
| 2020/0330011 | A1* | 10/2020 | Honore | A61B 5/14552 |
| 2021/0051742 | A1* | 2/2021 | Ganesan | H04W 76/11 |
| 2021/0090066 | A1* | 3/2021 | Beye | H04L 9/088 |
| 2021/0243599 | A1* | 8/2021 | Lee | H04L 9/14 |
| 2021/0243707 | A1* | 8/2021 | Ishii | H04J 3/0658 |

OTHER PUBLICATIONS

M. Nawir, A. Amir, N. Yaakob, and O. B. Lynn, "Internet of things (iot): Taxonomy of security attacks," in 2016 3rd International Conference on Electronic Design (ICED). IEEE, 2016, pp. 321-326.
E. Rescorla, N. Modadugu et al., "Datagram transport layer security version 1.2," 2006.
Y. Zhang, J. Weng, R. Dey, and X. Fu, Bluetooth Low Energy (BLE) Security and Privacy. Cham: Springer International Publishing, 2019, pp. 1-12. [Online].
Y. Wu, B. Chen, Z. Zhao, and Y. Cheng, "Attack and countermeasure on interlock-based device pairing schemes," IEEE Transactions on Information Forensics and Security, vol. 13, No. 3, pp. 745-757, 2017.
R. Prasad and N. Saxena, "Efficient device pairing using "humancomparable" synchronized audiovisual patterns," in International Conference on Applied Cryptography and Network Security. Springer,2008, pp. 328-345.
N. Saxena, J.-E. Ekberg, K. Kostiainen, and N. Asokan, "Secure device pairing based on a visual channel," in 2006 IEEE Symposium on Security and Privacy (S&P'06). IEEE, 2006, pp. 6-pp.
O. Chagnaadorj and J. Tanaka, "Mimicgesture: Secure device pairing with accelerometer-based gesture input," in Ubiquitous Information Technologies and Applications. Springer, 2013, pp. 59-67.
S. Bluetooth, "Bluetooth specification version 4.2," Specification of the Bluetooth System, 2014.
M. Miettinen, N. Asokan, T. D. Nguyen, A.-R. Sadeghi, and M. Sobhani, "Context-based zero-interaction pairing and key evolution for advanced personal devices," in Proceedings of the 2014 ACM SIGSAC Conference on Computer and Communications Security. ACM, 2014, pp. 880-891.
J. Han, M. Harishankar, X.Wang, A. J. Chung, and P. Tague, "Convoy: Physical context verification for vehicle platoon admission," in Proceedings of the 18th InternationalWorkshop on Mobile Computing Systems and Applications. ACM, 2017, pp. 73-78.
F. Stajano and R. Anderson, "The resurrecting duckling: Security issues for ad-hoc wireless networks," in International workshop on security protocols. Springer, 1999, pp. 172-182.
C. Soriente, G. Tsudik, and E. Uzun, "Hapadep: human-assisted pure audio device pairing," in International Conference on Information Security. Springer, 2008, pp. 385-400.

J. M. McCune, A. Perrig, and M. K. Reiter, "Seeing-is-believing: Using camera phones for human-verifiable authentication," in 2005 IEEE Symposium on Security and Privacy (S&P'05). IEEE, 2005, pp. 110-124.
A. Kumar, N. Saxena, G. Tsudik, and E. Uzun, "Caveat eptor: A comparative study of secure device pairing methods," in 2009 IEEE International Conference on Pervasive Computing and Communications. IEEE, 2009, pp. 1-10.
H. Krawczyk, "Sigma: The 'sign-and-mac' approach to authenticated diffie-hellman and its use in the ike protocols," in Annual International Cryptology Conference. Springer, 2003, pp. 400-425.
J.-H. Hoepman, "Ephemeral pairing on anonymous networks," in International Conference on Security in Pervasive Computing. Springer, 2005, pp. 101-116.
Jaap-henk Hoepman, "The ephemeral pairing problem," in International Conference on Financial Cryptography. Springer, 2004, pp. 212-226.
A. Perrig and D. Song, "Hash visualization: A new technique to improve real-world security," in International Workshop on Cryptographic Techniques and E-Commerce, 1999, pp. 131-138.
R. Mayrhofer and M. Welch, "A human-verifiable authentication protocol using visible laser light," in The Second International Conference on Availability, Reliability and Security (ARES'07). IEEE, 2007, pp. 1143-1148.
D. Balfanz, G. Durfee, R. E. Grinter, D. K. Smetters, and P. Stewart, "Network-in-a-box: How to set up a secure wireless network in under a minute." in USENIX Security Symposium, vol. 207, 2004, p. 222.
T. Kindberg and K. Zhang, "Secure spontaneous device association," in International Conference on Ubiquitous Computing. Springer, 2003, pp. 124-131.
J. Lester, B. Hannaford, and G. Borriello, ""are you with me?"— using accelerometers to determine if two devices are carried by the same person," in International Conference on Pervasive Computing. Springer, 2004, pp. 33-50.
L. E. Holmquist, F. Mattern, B. Schiele, P. Alahuhta, M. Beigl, and H.-W. Gellersen, "Smart-its friends: A technique for users to easily establish connections between smart artefacts," in international conference on Ubiquitous Computing. Springer, 2001, pp. 116-122.
R. Mayrhofer and H. Gellersen, "Shake well before use: Intuitive and secure pairing of mobile devices," IEEE Transactions on Mobile Computing, vol. 8, No. 6, pp. 792-806, 2009.
R. Jin, L. Shi, K. Zeng, A. Pande, and P. Mohapatra, "Magpairing: Pairing smartphones in close proximity using magnetometers," IEEE Transactions on information forensics and security, vol. 11, No. 6, pp. 1306-1320, 2015.
M. Li, S. Yu, W. Lou, and K. Ren, "Group device pairing based secure sensor association and key management for body area networks," in 2010 Proceedings IEEE INFOCOM. IEEE, 2010, pp. 1-9.
S. Pan, N. Wang, Y. Qian, I. Velibeyoglu, H. Y. Noh, and P. Zhang, "Indoor person identification through footstep induced structural vibration," in Proceedings of the 16th International Workshop on Mobile Computing Systems and Applications. ACM, 2015, pp. 81-86.
J. Han, A. J. Chung, M. K. Sinha, M. Harishankar, S. Pan, H. Y. Noh, P. Zhang, and P. Tague, "Do you feel what i hear? enabling autonomous iot device pairing using different sensor types," in 2018 IEEE Symposium on Security and Privacy (SP). IEEE, 2018, pp. 836-852.
M. F. Haroun and T. A. Gulliver, "Secret key generation using chaotic signals over frequency selective fading channels," IEEE Transactions on Information Forensics and Security, vol. 10, No. 8, pp. 1764-1775, 2015.
A. Becker and I. C. Paar, "Bluetooth security & hacks," Ruhr-Universitat Bochum, 2007.
D. Spill and A. Bittau, "Bluesniff: Eve meets alice and bluetooth." WOOT, vol. 7, pp. 1-10, 2007.
K. Munro, "Breaking into bluetooth," Network Security, vol. 2008, No. 6, pp. 4-6, 2008.

(56) References Cited

OTHER PUBLICATIONS

K. Haataja and P. Toivanen, "Practical man-in-the-middle attacks against bluetooth secure simple pairing," in Wireless Communications, Networking and Mobile Computing, 2008. WiCOM'08. 4th International Conference on. IEEE, 2008, pp. 1-5.

K. M. Haataja and K. Hypponen, "Man-in-the-middle attacks on bluetooth: a comparative analysis, a novel attack, and countermeasures," in Communications, Control and Signal Processing, 2008. ISCCSP 2008. 3rd International Symposium on. IEEE, 2008, pp. 1096-1102.

C. Gomez, J. Oller, and J. Paradells, "Overview and evaluation of bluetooth low energy: An emerging low-power wireless technology," Sensors, vol. 12, No. 9, pp. 11 734-11 753, 2012.

M. Ryan, "Bluetooth: With low energy comes low security," in Proceedings of the 7th USENIX Conference on Offensive Technologies, ser. WOOT'13. Berkeley, CA, USA: USENIX Association, 2013, pp. 4-4. [Online].

T. Rosa, "Bypassing passkey authentication in bluetooth low energy." IACR Cryptology ePrint Archive, vol. 2013, p. 309, 2013.

W. K. Zegeye, "Exploiting bluetooth low energy pairing vulnerability in telemedicine," in International Telemetering Conference Proceedings. International Foundation for Telemetering, 2015.

D.-Z. Sun, Y. Mu, and W. Susilo, "Man-in-the-middle attacks on secure simple pairing in bluetooth standard v5.0 and its countermeasure," Personal and Ubiquitous Computing, vol. 22, No. 1, pp. 55-67, 2018.

Y. Zhang, J. Weng, R. Dey, Y. Jin, Z. Lin, and X. Fu, "On the (in) security of bluetooth low energy one-way secure connections only mode," arXiv preprint arXiv:1908.10497, 2019.

P. Grivet and A. Blaquiere, "Nonlinear effects of noise in electronic clocks," Proceedings of the IEEE, vol. 51, No. 11, pp. 1606-1614, 1963.

Y.-J. Lee, A. Khaligh, and A. Emadi, "Advanced integrated bidirectional ac/dc and dc/dc converter for plug-in hybrid electric vehicles," IEEE Transactions on vehicular technology, vol. 58, No. 8, pp. 3970-3980, 2009.

\* cited by examiner

PERIPHERAL-FREE SECURE PAIRING PROTOCOL BY RANDOMLY SWITCHING POWER

TECHNICAL FIELD

The present disclosure relates to the field of Internet-of-Things, particularly to a method and system for designing a peripheral-free secure pairing protocol by randomly switching power.

BACKGROUND

Internet of Things (IoT) is an upcoming paradigm that has received a lot of attention recently. It features a broad spectrum of applications, ranging from smart home appliances to smart city and vehicle to vehicle networks. In the context of IoT, different things are interconnected, and a user may control the things via a smart controller such as a smartphone over a network. IoT arguably will change the way we conduct our everyday affairs. Recent reports and statistics indicate that more than 30 billion devices/things will be connected to the internet by the end of 2020. This number will hit 75 billion by 2025. However, IoT system is susceptible to various attacks that may threat the security of IoT, such as Man-in-the-Middle (MITM) attacks and spoofing attacks. Countermeasures have been proposed to hinder these attacks, and using pairing protocols is one of these countermeasures. An IoT system usually involves a cloud server, some IoT devices, and a remote controller such as a smartphone with specific apps. The communications between the cloud server and the remote controller/IoT devices may be secured by public-key cryptographic protocols such as Transport Layer Security (TLS) protocol, while pairing is designed to build upon a secure channel for the IoT devices and the remote controller. One example of pairing protocol is Bluetooth Simple Secure Protocol (SSP), which enables two devices equipped with Bluetooth modules such as a remote controller and an IoT device in close proximity to communicate securely. Pairing protocols that require the pairing devices in close proximity such as Bluetooth SSP are referred to as proximity-based device pairing protocol. In these schemes, the owner is close to his pairing devices (i.e., the remote controller and the IoT devices) and may need to perform specific operations, while the attackers are further away and do not have physical access to the pairing devices. To achieve the pairing protocols, trusted auxiliary channels such as audio-visual signal, correlated human behavior are involved to exchange a code, which latter is used to derive a security key on each pairing device. For example, in Passkey-entry pairing strategy of Bluetooth Low Energy (BLE), one device (either the remote controller or the IoT device) displays a 6 digits pin (i.e. code), while the pairing operator sees the pin, and enters the pin to another device. In the Numeric Comparison pairing strategy of BLE, the owner has to check if pins displayed on the two pairing devices are the same and make confirmation by pressing the "YES" buttons on both devices. The implementation of these proximity-based device pairing protocols increases the cost of the IoT system significantly and manufacturers have to incur extra costs to guarantee the security of their products. For example, Passkey-entry or Numeric Comparison of BLE requires at least one of the devices to be paired to be equipped with displays or keypads, while other protocols may require both of the devices to be integrated out of band communication modules, such as NFC modules, speakers or cameras. Given the extra cost of using secure pairing strategies, the manufacturers may want to use insecure pairing protocols such as Just Works of Bluetooth. For example, it is unacceptable for some low-priced devices, such as smart lamp to equip a display or keyboard only for pairing purpose. Further, using insecure protocols rather than the secure pairing protocols may have serious security threats. To address the issue, the present disclosure provides a method and system for designing a peripheral-free secure pairing protocol which makes the IoT system cost effective.

SUMMARY

To address the issues described above, the present disclosure proposes method and system for designing a peripheral-free secure pairing protocol by randomly switching power.

The following technical solutions are used in the implementations of the present disclosure:

An implementation of the present disclosure provides a method for pairing a plurality of devices in an internet of things (IoT) system. The method includes following steps:

connecting power supplies of the plurality of devices to a same power source, the plurality of devices includes an initiator device and a responder device;

exchanging pairing features of the initiator device and the responder device with each other;

synchronizing clocks of the initiator device and the responder device so that the clocks of the initiator device and the responder device start measuring time at a same initial time point $t_0$;

switching the power source off and on for a plurality of times n;

through the clock of the initiator device, recording a plurality of initiator device time stamps $S(T)_i = \{T_1, T_2, T_3, \ldots T_n\}$ in the initiator device corresponding to time stamps when the initiator device switches off in response to switching off of the power source;

through the clock of the responder device, recording a plurality of responder device time stamps $S(T)_r = \{T_1, T_2, T_3, \ldots T_n\}$ in the responder device corresponding to time stamps when the responder device switches off in response to switching off of the power source;

exchanging the initiator device time stamps $S(T)_i$ with the responder device and the responder device time stamps $S(T)_r$ with the initiator device; and performing the pairing of the initiator device and the responder device if each of the initiator device time stamps is within a predefined delay tolerance of a corresponding time stamp of the responder device time stamps, otherwise rejecting the pairing of the initiator device and the responder device.

Preferably, the predefined delay tolerance $\tau$ is defined by formula $$\tau = tp_{com} = \text{MAX}\{tp_I, tp_R\};$$

where, $tp_{com}$ is a common time precision and is equal to maximum of a time precision of the initiator device $tp_I$ and a time precision of the responder device $tp_R$. The time precision of the initiator device $tp_I$ is a delay between switching off of the power source and actual switching off of the initiator device and the time precision of the responder device $tp_R$ is a delay between switching off of the power source and actual switching off of the responder device.

Preferably, the predefined delay tolerance is 120 ms.

Preferably, $n>4$.

Preferably, a time interval between each two consecutive operations of switching the power source off and on is different.

Preferably, the time interval between each two consecutive operations of switching the power source off and on is at least 8 seconds.

Preferably, a time interval between two consecutive operations of switching the power source off and on is 8 seconds.

Preferably, the method further includes:

sharing a public key $PK_I$ of the initiator device with the responder device through the initiator device and sharing a public key $PK_R$ of the responder device with the initiator device through the responder device;

generating a random number $r_I$ in the initiator device and a random number $r_R$ in the responder device;

defining an initiator commitment $C_I$ in the initiator device as $C_I = F (PK_R, PK_I, r_I, S(T)_i)$;

defining a responder commitment $C_R$ in the responder device as $C_R = F (PK_R, PK_I, r_R, S(T)_r)$;

where, $F(.)$ is a first hash function; and the step of exchanging the initiator device time stamps $S(T)_i$ with the responder device and the responder device time stamps $S(T)_r$ with the initiator device comprises sharing the initiator commitment $C_I$ with the responder device and the responder commitment $C_R$ with the initiator device.

In another implementation of the present disclosure an internet of things (IoT) system is provided. The IoT system includes a plurality of devices; a common power source and at least one processor. Power supplies of the plurality of devices are connected to the power source, and the plurality of devices include an initiator device and a responder device. The initiator device and the responder device form an alternative communication channel through the power source. The processor is configured to exchange pairing features of the initiator device and the responder device with each other. The processor is configured to synchronize clocks of the initiator device and the responder device through the alternative communication channel so that the clocks of the initiator device and the responder device start measuring time at a same initial time point $t_0$. The secure pairing of the initiator device and the responder device is provided by switching the power source off and on for a plurality of times n.

Through the clock of the initiator device, the processor is configured to record a plurality of initiator device time stamps $S(T)_i = \{T_1, T_2, T_3, \ldots T_n\}$ in the initiator device corresponding to time stamps when the initiator device switches off in response to switching off of the power source. Through the clock of the responder device, the processor is configured to record a plurality of responder device time stamps $S(T)_r = \{T_1, T_2, T_3, \ldots T_n\}$ in the responder device corresponding to time stamps when the responder device switches off in response to switching off of the power source. The processor is configured to exchange the initiator device time stamps $S(T)_i$ with the responder device and the responder device time stamps $S(T)_r$ with the initiator device. The processor is configured for performing the pairing of the initiator device and the responder device if each of the initiator device time stamps is within a predefined delay tolerance of a corresponding time stamp of the responder device time stamps, otherwise rejecting the pairing of the initiator device and the responder device.

Preferably, in the IoT system, the predefined delay tolerance τ is defined by formula $$\tau = tp_{com} = MAX\{tp_I, tp_R\};$$

where, $tp_{com}$ is a common time precision and is equal to maximum of a time precision of the initiator device $tp_I$ and a time precision of the responder device $tp_R$;

the time precision of the initiator device $tp_I$ is a delay between switching off of the power source and actual switching off of the initiator device and the time precision of the responder device $tp_R$ is a delay between switching off of the power source and actual switching off of the responder device.

Preferably, in IoT system, the predefined delay tolerance is 120 ms.

Preferably, n>4.

Preferably, a time interval between two consecutive operations of switching the power source off and on is 8 seconds.

Preferably, a time interval between each two consecutive operations of switching the power source off and on is different.

Preferably, the time interval between each two consecutive operations of switching the power source off and on is at least 8 seconds.

Preferably, the processor is configured to execute following operations: sharing a public key $PK_I$ of the initiator device with the responder device through the initiator device and sharing a public key $PK_R$ of the responder device with the initiator device through the responder device;

generating a random number $r_I$ in the initiator device and a random number $r_R$ in the responder device;

defining an initiator commitment $C_I$ in the initiator device as $C_I = F (PK_R, PK_I, r_I, S(T)_i)$;

defining a responder commitment $C_R$ in the responder device as $C_R = F (PK_R, PK_I, r_R, S(T)_r)$;

where, $F(.)$ is a first hash function; and the processor is configured for exchanging the initiator device time stamps $S(T)_i$ with the responder device and the responder device time stamps $S(T)_r$ with the initiator device comprises sharing the initiator commitment $C_I$ with the responder device and the responder commitment $C_R$ with the initiator device.

BRIEF DESCRIPTION OF THE DRAWINGS

The drawings described here are intended to provide a further understanding of the present disclosure, and constitute a part of the present disclosure. The illustrative implementations of the present disclosure and description of the implementations are intended to describe the present disclosure, and do not constitute limitations on the present disclosure.

DETAILED DESCRIPTION OF THE EMBODIMENTS

The exemplary embodiments of the present disclosure are described below in detail with reference to the drawings. It should be understood that the exemplary embodiments described below are used only to illustrate and interpret the present disclosure and are not intended to limit the present disclosure.

It should be noted that the exemplary embodiments of the present disclosure and features in the exemplary embodiments may be combined with each other in the case of no conflict, and all the combinations fall within the protection scope of the present disclosure. In addition, although a logical order is shown in the flowchart, the steps shown or described may be performed in a different order from the order here in some cases.

In implementations, a computing device that performs a data processing method may include one or more processors (CPU, Central Processing Module), an input/output interface, a network interface and a memory.

The memory may include a volatile memory, a random access memory (RAM) and/or a non-volatile memory and other forms in a computer readable medium, for example, a read-only memory (ROM) or a flash RAM. The memory is an example of the computer readable medium. The memory may include a module 1, a module 2, . . . , and a module N (N is an integer greater than 2).

The computer readable medium includes non-volatile and volatile media as well as removable and non-removable storage media. A storage medium may store information by means of any method or technology. The information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic disk storage or other magnetic storage devices, or any other non-transmission media, and may be used to store information accessible to the computing device.

Figure 1:
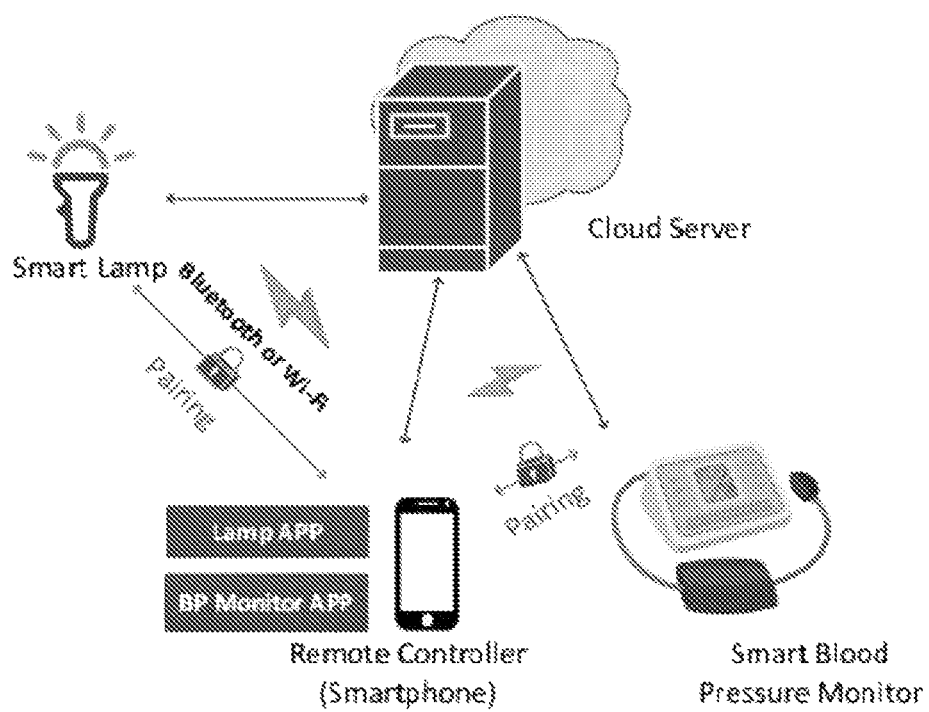
FIG. 1 shows an architecture of an IoT system.

Referring to FIG. 1, an IoT system usually involves a cloud server, some IoT devices and a remote controller such as a smartphone with specific apps. The IoT devices may implement various of functions, such as medical monitoring or lighting. The remote controller is used to control and observe the status of the IoT devices. Basically, the remote controller and an IoT device may communicate with each other directly through a same communication channel such as Bluetooth or Wi-Fi networks. However, when they are not in the same local network, the cloud server will relay the traffic between the device and controller. For a lighting system, the smart lamp is an IoT device, which provides the lighting service for users. The user may use his remote controller (e.g. his smartphone) to control the smart lamp through Bluetooth or Wi-Fi. Initially, a user may want to bind the controller with the IoT device via various communication channels, which is referred to as pairing. The pairing process is very crucial for security of the IoT system (data as well as devices), considering that attackers may deploy eavesdropping or MITM attacks, taking benefit of vulnerabilities of IoT devices and can compromise the security of the entire IoT system.

In an embodiment of the present disclosure, a user has one or more IoT devices, and can control these devices via a remote controller and enables a secure communication of the pairing process. Particularly, the present disclosure makes the following assumptions:

1) The attacker does not have physical access of user's devices, including the IoT device, the remote controller and the power source which is used in our protocol. This is reasonable since these devices are sensitive gadgets, and people normally tend them carefully.

2) The pairing devices have power supply chargers and each of them has an onboard clock. Note that most of devices have power supply changers. Alternatively, if they do not have any (e.g., battery-based), vendors can enable the related interface to support one with negligible costs. For the onboard clocks, most of the devices/chips have electronic clocks.

3) In some sophisticated attacks, the attacker may peep the operation of users, one difference to many other secure pairing protocols such as Passkey Entry of BLE, which do not make such an assumption. That is, these protocols cannot defend such a sophisticated attack.

4) The attacker can obtain the same type of device and the official app as the user does. This is reasonable since the apps are free to download, while an attacker can purchase the same type of device on the market with little effort. This assumption is made because the security of the protocol of the present disclosure does not rely on the disclosure of the algorithm involved in the protocol.

5) The cryptographic algorithms are not the source of the vulnerabilities. For example, attackers cannot break the algorithm such as SHA256 hash algorithm used in the protocol.

The security of pairing depends on how the two devices exchange their messages for secret agreement. That is, if the secret is transferred from one device to another securely, the pairing protocol is secure. For example, in Passkey Entry of BLE, correlated human behavior is such a trusted channel. The owner of the two devices works as a relay, and he sees the six digits from one device and types it into another device. Without loss of generality, the present disclosure, therefore, define two channels: (i) Communication channel refers to the channel through which the data other than secrets (secret data) will be transferred. (ii) Auxiliary channel refers to the trusted channel through which the secrets will be transferred.

Originally, for the devices that do not have any input/output capabilities, there is no other way except a communication channel for them to exchange parameters. Therefore, in the present embodiment, an alternative communication channel is made via a power source (e.g. a plug). Two devices to be paired are connected to the same power source, by using their own power supply charger. Both devices synchronize their clock frequencies via the communication channel. The owner of the two devices can then switch the power source on and off intentionally for a few times. If each device records the time points of the power switch off/on, the recorded time points contains enough amount of information, which is used to derive the same encryption key. Also, the auxiliary channel used is secure enough to defend attacks such as eavesdropping attack and guessing attacks.

Pairing Procedure

Figure 2:
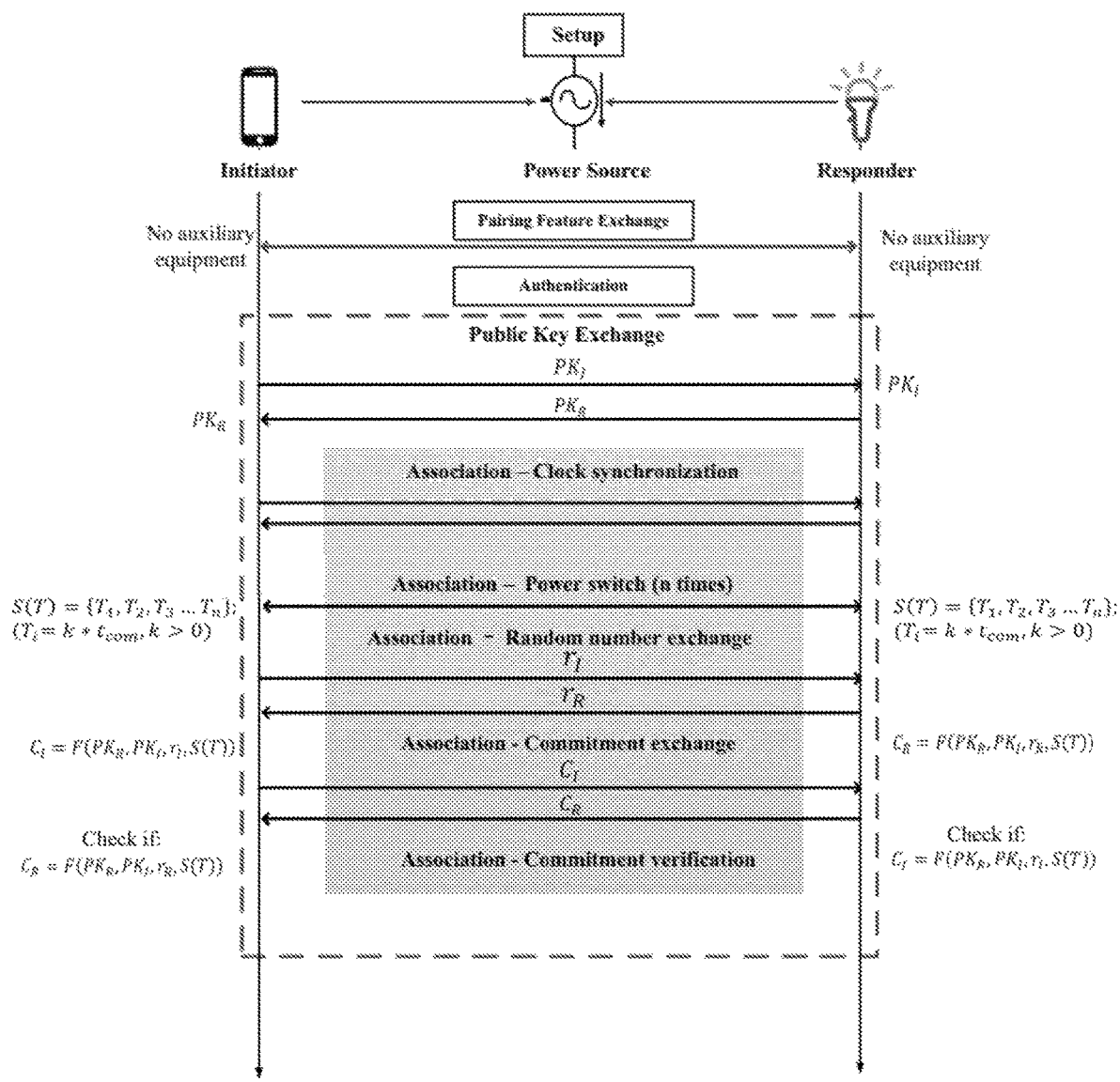
FIG. 2 shows workflow of a method of pairing according to an embodiment of the present disclosure.

The pairing procedure of the present disclosure is explained below in detail. For the sake of easy presentation, the pairing initiator is denoted as I, and the pairing responder is denoted as R. The pairing devices (both initiator and responder) have a public/private key pair. Also, all the pairing devices do not have any auxiliary equipment. Referring to FIG. 2, the pairing protocol is elaborated below and notations to be used are described in Table 1 for the easy understanding.

1) Setup: Initially, the owner of the two devices plugs the two devices into the same power source.
2) Pairing Feature Exchange: When the pairing process starts, I and R exchange their pairing features. At this moment, they are ready to initiate the SwitchPairing authentication.
3) Authentication—Public Key Exchange: The initiator and responder devices exchange public keys with each other. The exchanged public keys are denoted as PKI and $PK_R$, where PKI refers to the public key of the initiator, while $PK_R$ refers to the public key of the responder.

TABLE 1

Summary of notations

| Notation | Description |
|---|---|
| $PK_i$ | the public key of a pairing device i |
| $SK_i$ | the private key of a pairing device i |
| F(.) | a hash function. |
| H(.) | a hash function other than F(.) |
| DH(.) | the Elliptic-curve Diffie-Hellman (ECDH) key exchange algorithm |
| P(.) | a hash function |

4) Authentication—Association: The authentication and association steps are as below:
a) The two devices synchronize their clocks. Once synchronized, the clock of each device starts timing at the same time. The initial time point is denoted as $t_0$. Please note that the initial time usually will not be a part of the secret.
b) The user switches off the power source, so the power supply of both devices goes off. Both devices lose their power at the same moment t1, which is recorded individually by each device. The user turns the plug on afterward. The user again repeats this step for n−1 times (n>4), depending on the security requirements of the application scenario, which will result in n time points. At this time, each device will store the time stamps of each off operation as secrets $$S(T)=\{t_1,t_2,t_3,\ldots t_n\} \quad (1)$$

It is worthy-noting that there is a delay between the time when a user switch-off/on the power source and the time when devices really are turned off/on. Such a delay is unavoidable due to the working principle of AC-DC converter. However, due to the diversity of integration and implementation, the delay may also vary from one device to another, causing the timing obtained on each device is different, which shall not be ignored. Regarding this, a processing strategy to counter the delays will be discussed ahead.

c) Each device generates a random number $r_I$ and $r_R$ respectively. Then the initiator device and the responder device exchange the random numbers with each other.
d) Each device feeds the random number and their public key together with S(T) into a function F(.) to compute a commitment. The initiator will have commitment $C_I$:

$$C_I=F(PK_R,PK_I,S(T)) \quad (2)$$

and the responder will have commitment $C_R$:

$$C_R=F(PK_R,PK_I,S(T)) \quad (2)(3)$$

Each device exchanges the commitments. Then each device verifies if random numbers, public keys and secrets can result in desired commitments. If yes, the same key can be generated from these parameters:

$$DH\ Key = DH(SK_A, PK_B) \quad (4)$$
$$= DH(SK_B, PK_A)$$

where $SK_A$ and $SK_B$ are the corresponding private keys of $PK_A$ and $PK_B$ respectively.

$$Key=P\{DHKey,S(T),r_R,r_I\} \quad (5)$$

Please note that the demonstration is presented in the case of two pairing device, while the protocol can be also adopted for pairing of multiple devices. In the case of multiple devices, all devices shall be connected to the same power source and exchange public keys to each other (In the end of the pairing protocol, every two devices shall generate a key that can be used to communicate with each other), while the rest procedures are similar and will not be discussed in detail.

Delay Processing

As discussed above, there is generally a delay between the time when a user switches off/on the power source and the time when devices are actually turned off/on. This delay may vary from one device to another due to the manufacturing differences. In another embodiment of the present disclosure, a delay tolerance and fault tolerance are introduced to address this problem.

Delay Tolerance: A predetermined delay tolerance is defined according to the pairing devices and the IoT system. With the delay tolerance defined, when a user preforms the switch-off operations, if the difference between two delays is less than the delay tolerance, the two pairing devices can be considered as losing the power at the same time. Similar principles are also adopted when a user switches on the devices. For example, we assume the delay tolerance is τ. When user performs the switch-off operation, the time point of losing power for the initiator is $t_I$, while that for the responder is $t_R$. If the equation 6 is satisfied, the two devices can be considered as losing power at the same time.

$$|t_I-t_R|<\tau \quad (6)$$

However, obtaining the difference between $t_I$ and $t_R$ is tricky since the time points cannot be transferred through the communicating channel. So, in another embodiment, τ is determined to be equal to the common time precision of the pairing devices (i.e., the minimal measurement of time for the pairing devices). In such a way, we can change τ by modifying the time precision of the pairing devices without transferring the time points. The common time precision of two pairing devices is defined as follows:

$$\tau=tp_{com}=MAX\{tp_I,tp_R\} \quad (7)$$

where $tp_I$ and $tp_R$ are the time precision of the pairing devices, respectively. For multiple devices, a common delay tolerance shall be negotiated in a similar way. For example, assume that m devices are connected to the same power source and when a user presses the switch off/on button of the power source, each device obtains the timing of losing power for itself, which can be represented as follows:

$$T_n=\{t_1,t_2,t_3,\ldots t_m\} \tag{8}$$

Therefore, the common delay tolerance for multiple devices is defined as follows:

$$\tau_{com}=MAX\{|t_i-t_j|\}=MAX\{tp_i,tp_j\} \tag{9}$$

where:

$$i \neq j; 0 < i,j \leq m; n > 2; \tag{10}$$

Fault tolerance: Another factor that may mitigate the delay issue is the fault tolerance. The fault tolerance in this context is the capability that allows the pairing procedure to continue computing the key properly in the scenario where the time points obtained by each pairing device are not exactly identical. Besides, for the same operation performed by the user (i.e., a switch off/on operation), if the time points obtained by each device are different, this event is referred to as an error. The number of errors over the number of switch off/on operations is denoted as the error rate. Basically, a lager fault tolerance will allow more errors. In another embodiment, an algorithm to enable the devices compute the error rate before the key generation without exchanging time points is introduced. To this end, both devices may want to exchange data other than the time points via the communicating channel and the data exchanged is termed evidence in the instant protocol. Considering the scenario where there are two pairing devices, denoted as device A and device B, who want to pair up. When the user turns off/on the power source n times (n>4), it will result in n time points on each device recorded as S(T) depending upon when each device switches off/on. At this time, device A has:

$$S(T)^A=\{t_1^A,t_2^A,t_3^A,\ldots t_n^A\} \tag{11}$$

while device B has:

$$S(T)^B=\{t_1^B,t_2^B,t_3^B,\ldots t_n^B\} \tag{12}$$

device A and device B then use the same hash function, denoted as H(.) to generate a vector, named evidence, respectively, which can be represented below:

$$H(S(T)^A)=\{H(t_1^A),H(t_2^A),H(t_3^A)\ldots H(t_n^A)\} \tag{13}$$

$$H(S(T)^B)=\{H(t_1^B),H(t_2^B),H(t_3^B)\ldots H(t_n^B)\} \tag{14}$$

Afterwards, the two pairing devices exchange their evidences and each device can compute the error rate ε respectively:

$$\varepsilon = \frac{\sum_{i=1}^{n} H(t_i^B) \oplus H(T_i^A)}{n} \tag{15}$$

where:

$$4 < i < |n \tag{16}$$

In such a way, if $t_i^A \approx t_i^B$, then $H(t_i^A) \oplus H(t_i^B)=1$ due to the property of hash functions. Therefore, each device can know if there are any errors during the pairing process without exchanging the time points. Meanwhile, if and only if the error rate is less than fault tolerance, the two devices can continue the pairing process. Otherwise, the two pairing devices will tear down the connection and abort the pairing process. For multiple devices (e.g. $S(D)=D_1, D_2, \ldots D_m$), each device will obtain a matrix after a user turns off/on the power source n times (n>4), which can be represented as follows:

$$\begin{Bmatrix} H(t_1^{D_1}) & H(t_2^{D_1}) & \cdots & H(t_n^{D_1}) \\ H(t_1^{D_2}) & H(t_2^{D_2}) & \cdots & H(t_n^{D_2}) \\ H(t_1^{D_3}) & H(t_2^{D_3}) & \cdots & H(t_n^{D_3}) \\ \cdots & \cdots & \cdots & \cdots \\ H(t_1^{D_m}) & H(t_2^{D_m}) & \cdots & H(t_n^{D_m}) \end{Bmatrix}$$

Due to the property of hash function, if and only if the rank of this matrix equals 1, the pairing process contains no errors. Otherwise, the error rate ε can be represented as follows:

$$\varepsilon = \frac{\sum_{i=1}^{m} H(t_i^{D_1}) \oplus H(t_i^{D_2}) \oplus \ldots H(t_i^{D_{n-1}}) \oplus H(t_i^{D_n})}{m} \tag{17}$$

where:

$$4 < i < m \tag{18}$$

It is worthy-noting that there is a trade-off between the fault tolerance and security, developers may want to specify the fault tolerance carefully according to the context. For mission critical applications, a low fault tolerance should be enforced to hinder potential attacks.

Figure 3A:
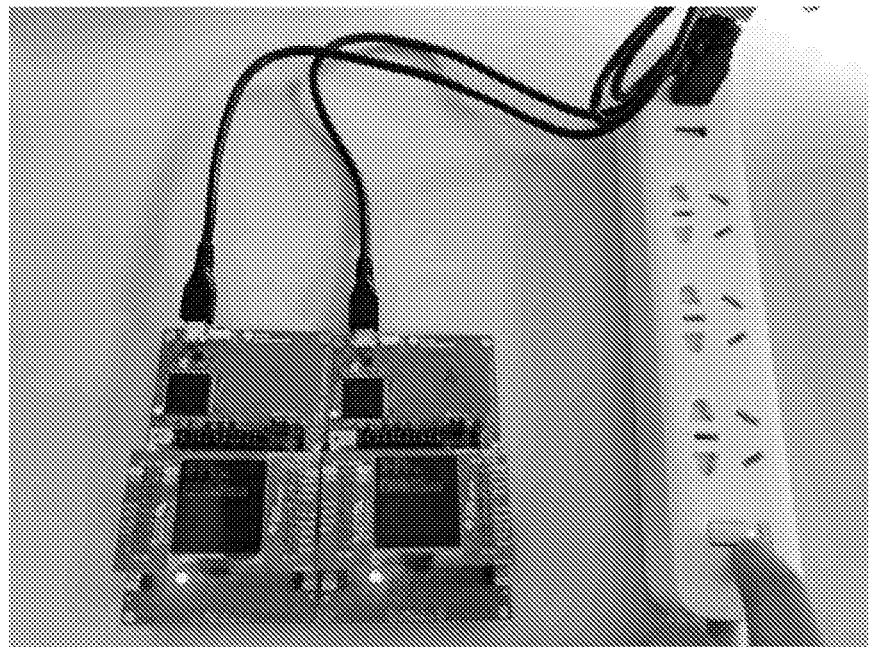
FIG. 3A and FIG. 3B show a prototype of the IoT system performing the pairing of an initiator device and a responder device.
Figure 3B:
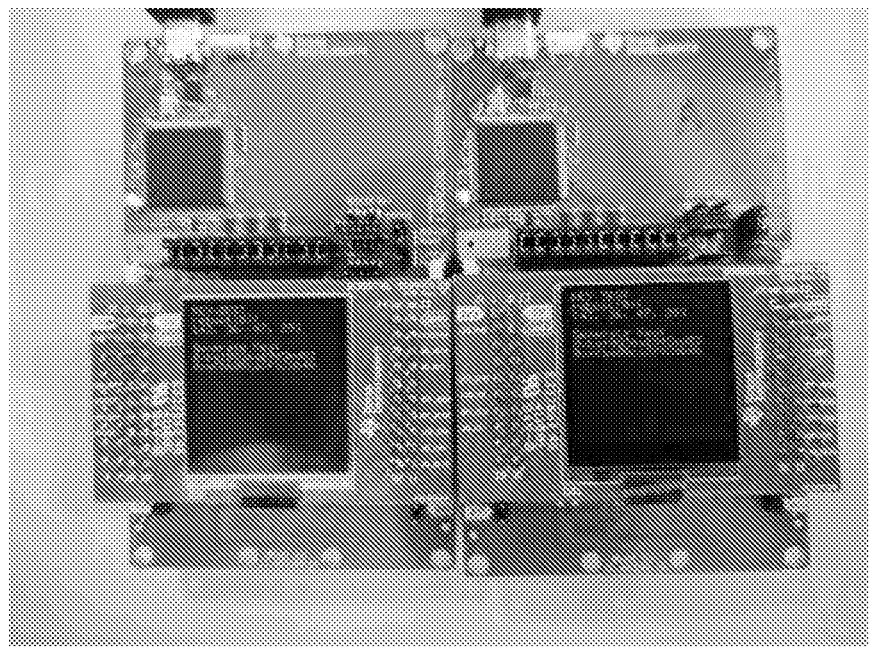

In another embodiment, the initiator device and the responder device are CC2640R2F development boards from TEXAS INSTRUMENT (TI) to show the feasibility of the SwitchPairing (the method of pairing the two devices). FIGS. 3A and 3B illustrate the prototype. In FIG. 3A, a user operates the plug to perform the association stage. In FIG. 3B, the two devices generate the same secret. Please note that the pairing protocol of the present disclosure suits all kinds of devices, even those without any input/output components. For the convenience of the demonstration, LCD display modules were installed on both development boards. For example, by comparing the time value sequences, it can be determined whether both devices have shared the same secret. The SDK platform from TI creates a variety of developing solutions for developers to build their own products. In regards of security, TI CC2640R2F has an AES accelerator and an ECC library in ROM. Therefore, we may use the off-the shelf cryptographic APIs, without having to reimplement. In particular, the protocol of the instant disclosure is built on the top of a typical BLE peripheral solution named "Simple Peripheral", since this solution integrates BLE stack and a simple BLE application that handles the basic communication process.

The pairing protocol involves the clock synchronization and beating mechanism, and these should be carefully crafted. Keys are stored in the flash of the chip when the power goes off so that the pairing process is not required to be repeated.

Clock mechanism: In TI's SDK, clock instances are used to define delayed or periodic tasks. The TI's Real-Time Operating System (TI-RTOS), which is a light-weight, multithread operating system, will schedule such tasks according to a given number of systems ticks. We used clock instances to design a heartbeat mechanism. Specifically, a device will start the synchronization with its peer device when it is in the pairing stage. Meanwhile, a clock instance is initialized and starts to perform a periodic heartbeat task every once in a cycle period of T. We denote this T as temporal precision for the easy of presentation. Particularly, according to the experiment, the optimal temporal precision for the TI CC2640 is 50 ms. That is, in every second, the TI CC2640 may generate 1000/50=20 different values that can be used to derive the key. In such a way, we can track the moment when users switch on/off the devices and generate a secret that is secure enough.

Secret Key storage: The Simple NV (SNV) is an area in the flash memory, which is dedicated for persistent data. According to the document, the data stored in the area will not be lost when power is off; it can be used to store sensitive data such as encryption keys. Therefore, we store the heartbeat data in this flash memory area with provided APIs osal snv read and osal snv write. Moreover, to protect hardware-based cracking, we disable the debugging ports after we finish the implementation.

The implementation criteria offer the community good guidelines to follow. Note that our criteria can also be extended to other chips and other communicating venues with little efforts. We used the TI CC2640 as a demonstration due to its prevalence. Particularly, periodic tasks and persistent memory are two fundamental features to craft our protocol. Therefore, vendors can always implement our protocol on other chips with such features enabled.

Security Analysis

The pairing procedure of the design described in the disclosure follows the procedure of standard pairing protocol (e.g., Passkey Entry) strictly so that the design does not downgrade the security of secure pairing protocols. Particularly, the SwitchPairing defends the passive/active eavesdropping attacks, as well as guessing attack without any changes.

Passive Eavesdropping Attack

To deploy the passive eavesdropping attack in our context refers to that the attacker can obtain the actual time points when the user presses the button of power source passively, by using some kind of devices such as a sniffer. After obtaining time points, the attacker then uses the time point to compute the secrets. However, the secret is transferred through our "auxiliary channel". As discussed above, it is impossible for a regular attacker to deploy such an attack because they do not have physical access of user's personal devices such as an IoT device or a power source, since the attacker has no physical access to the power source and any chance to bug the power source.

Active Eavesdropping Attack

Deploying active eavesdropping attack in our context refers to such a scenario where a strong attacker can supervise the user somehow, such as an attacker stands around the user and peeks the user's operations. Many legacy pairing protocols, such as PIN based pairing protocols or Visual/Audio-based pairing protocols, cannot defend such a type of attack. For example, the PIN based pairing protocol will fail if the attacker can peek the six digits PIN. In such a case, the attacker may block the victim devices and deploy the MITM attack without any change. The method of pairing devices or the protocol defined as the subject matter of this disclosure can defend this type of attack. This is because the reaction speed of a human subject is relatively slow when compared to machines. Even if the attacker observes that a user presses the button, it still takes a while for him to handle the information and record the actual time.

Guessing Attack

In guessing attack, instead of passive or active eavesdropping the secrets, the attacker may want to obtain the correct secret by guessing. The success rate of defending the guessing attack depends on the amount of information contained in the transferred secret. Therefore, the exchanged parameter should be strong enough to hinder the guessing attacks. For example, in Passkey Entry protocol, the exchanged secret is set to a 6-digits number, ranging from "000000" to "999999". So, there are 1000000 possibilities. Given that the attacker only has one chance to make the secret right, the success rate for an attacker deploys such an attack is 0.000001. Our pairing protocol can also defend the guessing attack effectively. Particularly, we assume the common delay tolerance is tcom ms, so that it can generate 1000=tcom different values in a second. We assume that during the pairing process, the user performs n time of switch off/on operations. However, there is a time period between each time due to the reaction time of the user. We assume the reaction time of a user is Tr seconds. Therefore, we have the following equation, where P is the probability that an attacker deploys the guessing attack successfully:

$$P = \frac{1}{(1000 \times T_r / t_{com})^n} \quad (19)$$

For the CC2640 chips used in our experiments, the delay tolerance is 120. We let Tr=8 and n=4, which refers to a user may complete the association process by performing the switch on/off 4 times, and the reaction time for this user is 8 seconds. In such a condition, $$P = \frac{1}{\left(\frac{(1000 \times 8)}{100}\right)^4} \approx \frac{1}{18,974,736} = 5.3 \times 10^{-8}.$$

Compared with that of the Passkey Entry of BLE Pairing, which is $$P = \frac{1}{999,999} = 1 \times 10^{-6},$$

our Switchpairing is much more secure. Moreover, our design can be more secure when the user finishes his association process in a long time or preforms the switch off/on operations for more time.

Active Eavesdropping and Guessing Attack

A strong attacker may attempt to combine the active eavesdropping attack and the guessing attack together, crafting a sophisticated attack. In such a scenario, an attacker is capable of supervising the user, and he may obtain an estimated time at which the user presses the buttons by barely observing the user's operations via his naked eyes. Therefore, he may guess the actual time based on the estimated time. We argue that this is also not feasible due to the attacker can only have one try. If the guessing attempt fails, the two pairing devices will result in the same key and will not repeat the pairing process anymore. Actually, when performing the active eavesdropping attack, the attacker is deploying this type of attack subconsciously. Thus, this sophisticated attack is subject to active eavesdropping attack and our pairing protocol can defend this without any changes.

Evaluation

We conducted a set of evaluations to show the feasibility and security of SwitchPairing. Notably, our evaluation will cover the following aspects. We first show the impact of delay tolerance, switch off/on numbers. Afterward, we measure the overhead of our SwtichPairing. We then show how do various attacks fail when our SwtichPairing is enabled on the pairing devices. Finally, we also demonstrate that our protocol runs on multiple devices properly. Please note that fault tolerance is configured to zero by default unless explicitly stated otherwise, which will provide a higher security level for our pairing process. However, in the case of Switchpairing on multiple device, we also show the impact of fault tolerance.

The Impact of Delay Tolerance

Figure 4:
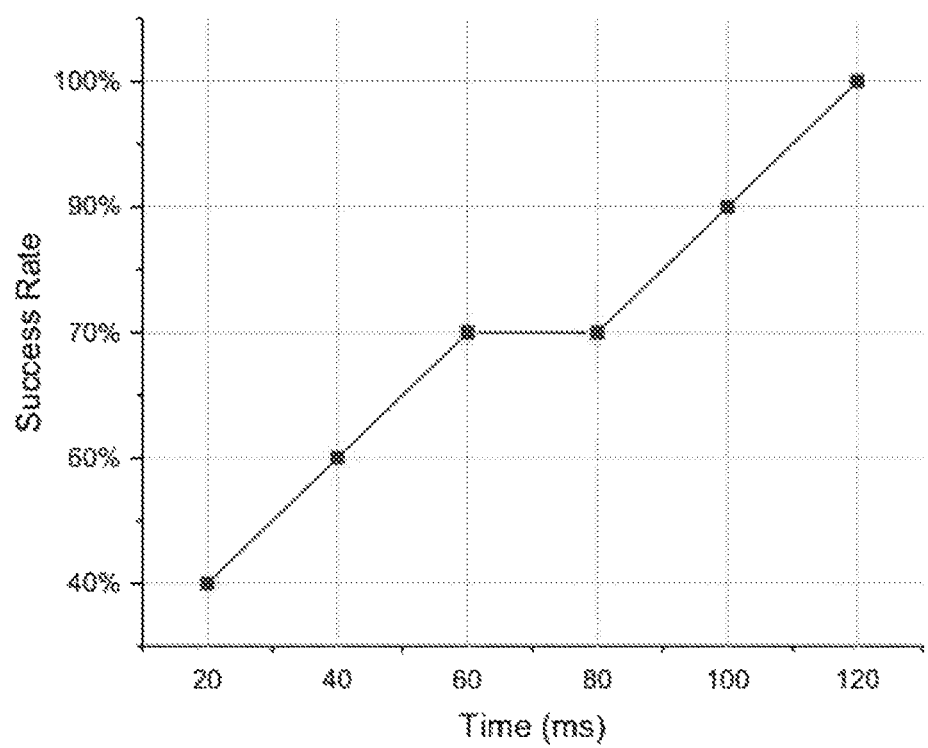
FIG. 4 shows a graph between success rate and delay tolerance for a method of pairing according to an embodiment of the present disclosure.

Obviously, for two given devices, the security of our pairing protocol partly depends on their common delay tolerance. In our experiment, we use two CC2640 chips, and the delay tolerance should be considered as the same. This experiment is used to explore the common delay tolerance of TI's CC2640 chip. The common delay tolerance is set to 20, 40, 60, 80, 100, 120 milliseconds, respectively. We perform the switch off/on operation 4 times as a test, and for each common delay tolerance, we carry out 10 tests; hence, the success rate is defined as the number of successful key generation (i.e., keys generated on both sides are identical) over 10. FIG. 4 shows the result. It can be observed that when the delay tolerance is 120 milliseconds, the two devices can always generate the same key.

The Impact of Switch Off/on Numbers

Figure 5:
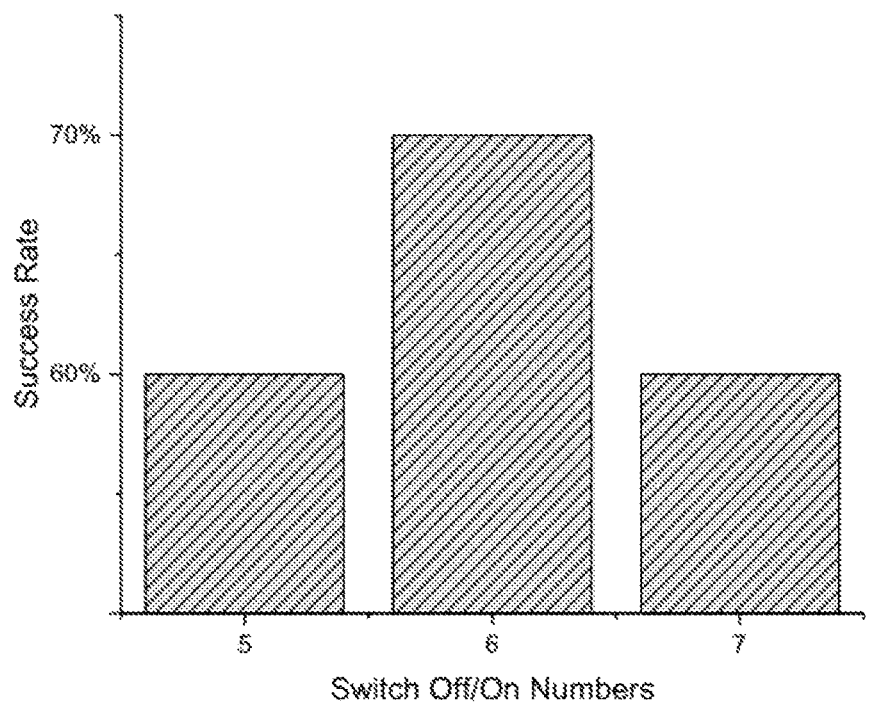
FIG. 5 shows a graph between the success rate and the number of switch off/on operations of the common power source.
Figure 6:
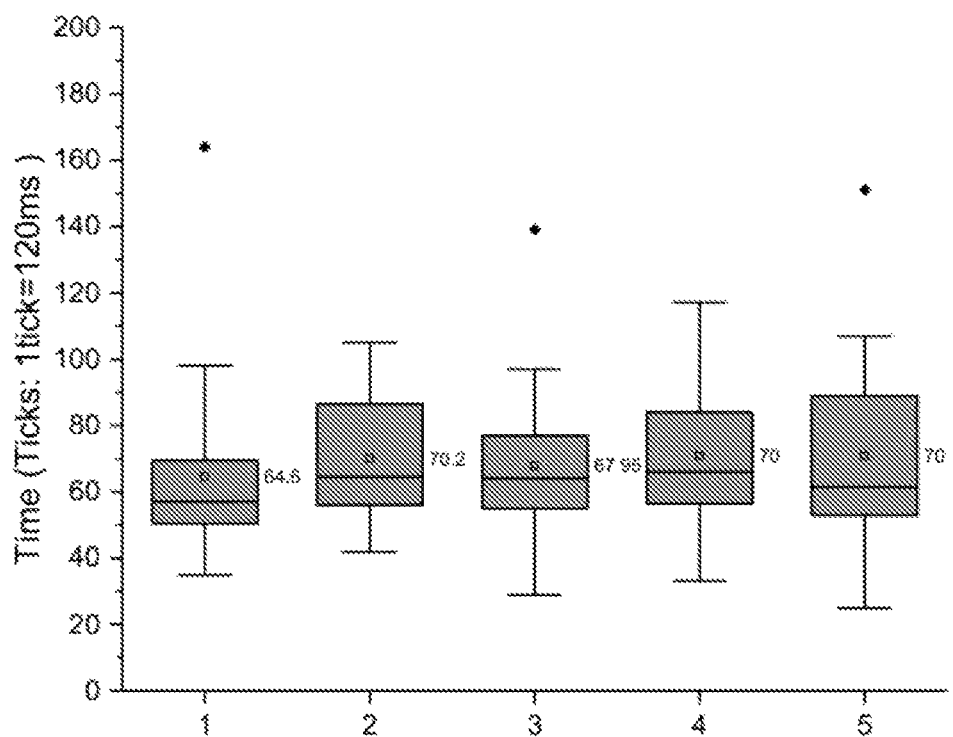
FIG. 6 shows a graph of time intervals between the switch on/of operations of the common power source.

In addition to the delay tolerance, vendors may also increase the number of switch off/on operations n to enlarge the key space, achieving stronger security protection, which we have elaborated above in security analysis. For instance, performing switch off/on four times to generate a key should be secure enough for home appliances, but it may fail to achieve the requirement of critical devices such as medical equipment. In this experiment, we will explore the impact of switch off/on numbers. To this end, we set the delay tolerance as 120 ms and perform switch off/on operations for 5, 6, 7 times, respectively. For each case, we carry out 10 tests; hence, the success rate is defined as the number of successful key generation (i.e., keys generated on both sides are identical) over 10. FIG. 5 shows the results. We can observe that even when n=7, we can still get an acceptable, successful pairing rate. However, according to equation 19, as n increases, the probability of executing a guessing attack successfully P will decrease exponentially. Some failures of the pairing process due to the issues of the device itself such as reboot failures. This is why the success rate is lager when n=6 than that when n=5. For the sake of rigor, we also factor in these results. We argue that these failures will be eliminated if the chips are better designed. For now, the vendors may want to tweak their delay tolerance to avoid this type of failure.

The Overhead of the Protocol

Figure 8:
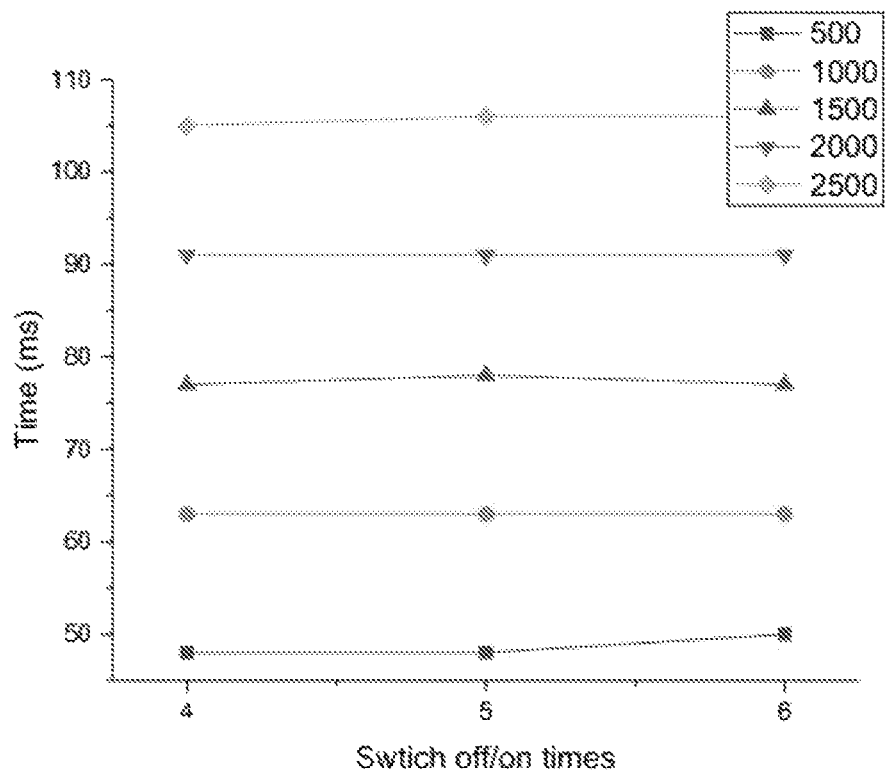
FIG. 8 shows overhead when MD5 algorithm is used.
Figure 9:
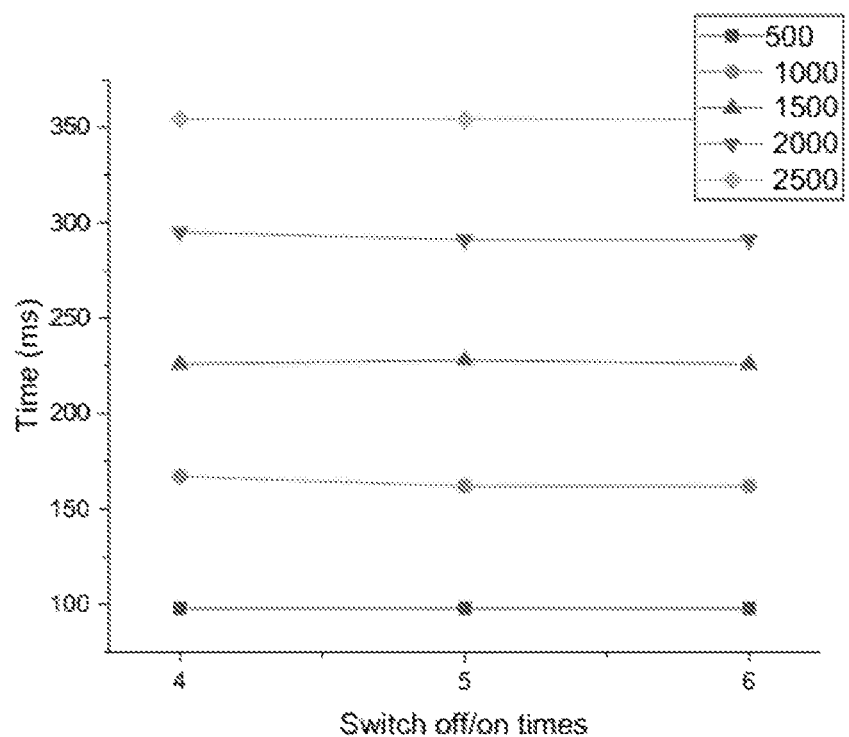
FIG. 9 shows overhead when SHA256 algorithm is used.

As explained above, the secrets are exchanged directly in some pairing protocols such as Passkey Entry of BLE. However, in the protocol disclosed in the instant disclosure, the secrets are hashed from the time points. Therefore, we want to evaluate the overhead of our protocol, i.e., the overhead caused by the calculation of the secrets. Two types of hash algorithms are evaluated, including MD5 and SHA256. We run each algorithm 500, 1000, 1500, 2000, 2500 times accordingly and the input of the hash function is the time points. Particularly, we randomly generate 4, 5, 6 time points respectively. FIG. 8 and FIG. 9 show the results. MD5 is used as an example to demonstrate that vendors can achieve high security by using the SHA256 instead of using MD5, since with the SHA256 enforced, only little overhead is involved, as shown in the figures. It can also be observed that the overhead will not increase rapidly when we increase the number of preforming the switch on/off. Regarding this, we can enhance the security of our protocol by simply increasing the required switch on/off times.

User Study I: The Time Intervals Between Operations

When a user operates the plug (i.e., switch on/off of the power source), we may want to know the time intervals between two operations. This is a fundamental parameter, which determines the other parameters related to the security of our protocol. As analyzed above, as the interval increases, the security of our protocol will increase rapidly. However, the operation speeds vary from one person to another. Therefore, we conducted a user study to set up a benchmark. Particularly, we used 20 human subjects. All the human subjects were required to switch on and off the plug 5 times. We set the delay tolerance as 120 ms and recorded the number of ticks between every two operations. It can be observed that the number of ticks between every two operations is around 69 (i.e., (64.6+70.2+67.95+70+70)/5=68: 55). Therefore, the time interval is around 69*120/1000=8 seconds.

User Study II: The Impact of Power Sources

This experiment explores the impact of different power sources. We conducted the experiment as follows. First, we plugged the two peer devices on two different power sources (two plugs). Then, a volunteer was asked to perform the pairing process. Specifically, each hand of the volunteer was supposed to control a specific power source. For example, the left hand may control the plug, which connects a master device, while the right hand may control the plug that a salve device connected. To conduct the pairing process, the volunteer may need to press the switch "on/off" button several times. Particularly, we recruited 5 human subjects as volunteers for performing the on/off operation. Before our experiment, we required the volunteers to press switch "on/off" button on each power plug synchronously every time. We set the delay tolerance as 120 ms and the number of times switching the power source "on/off" as four times. We run the test 10 times. Table 2 shows the results. It can be observed that the success rate is relatively low when they perform the switch off/on operations on different power sources. This experiment proves that the power source also has impact on the results. Therefore, for an attacker whose device is not connected to the same plug as the victim does, it is extremely challenging for the attacker to deploy attacks successfully.

TABLE 2

The impact of power sources

| User # | Total attempts | Succeed Attempts | Success Rate |
|---|---|---|---|
| 1 | 10 | 0 | 0% |
| 2 | 10 | 1 | 10% |
| 3 | 10 | 0 | 0% |
| 4 | 10 | 1 | 10% |
| 5 | 10 | 2 | 20% |

User Study III: Simulated Attacks

Figure 7:
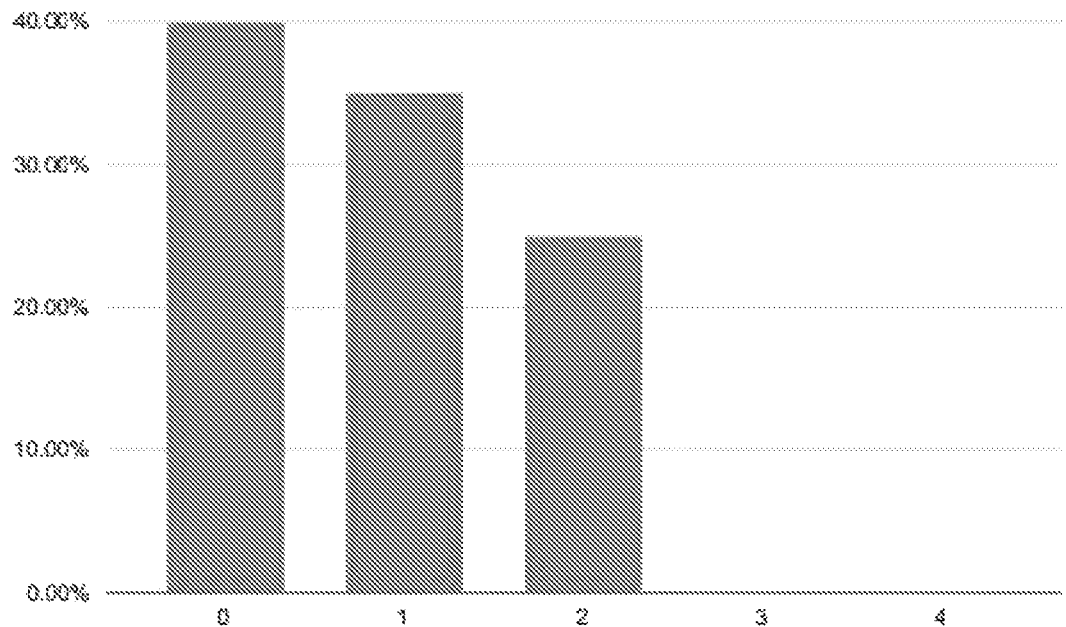
FIG. 7 shows a graph of number of successful attacking attempts vs the number of switch off/on operations of the common power source.

Passkey Entry is subject to an eavesdropping attack where a strong attacker can supervise the user somehow, such as the attacker stands around the user and peeps the Passkey on the display of the victim device. Once the attacker sees the Passkey, he may deploy the MITM attack. However, the proposed protocol can defend such an attacker innately since the reaction speed of a human subject is relatively slow when compared to machines. According to a report, the median reaction time of a human subject is around 215 ms, which is well above the bar used in our experiments (120 ms). To explore the feasibility of such an attack, we developed User Studies via 21 human subjects. In the first experiment, the 20 human subjects pretended to be attackers, whose goal was to deploy the attack introduced above. We provided each human subject (i.e., the "attacker") a suite of our testing device: a power source with a development board plugged in. The "attacker" can switch off/on the power source freely by pressing the "on/off" button on the plug, which will lead the development board to reboot. The remaining human subjects were asked to act like the victim. Basically, during our experiment, the victim will press the button 4 times. According to our analysis, a user switching on/off 4 times is secure enough when compared with the Passkey Entry of BLE. The "attackers" now were asked to press the "on/off" button as soon as he/she sees the victim doing so. We denote this action as an attacking attempt. FIG. 7 shows the results, which demonstrates the relationship between successful attacking attempts (all 4 times) and the number of "attackers". For example, the first column indicates that there were 40% attackers (which is 20×40%=8), failing in all 4 attacking attempts, while the second column indicates that there were 5 attackers successfully deploying one attacking attempt. Recall that if and only if all attacking attempts succeed, the same key can then be generated. Therefore, we conclude that no attacker was able to succeed. However, in order to counter persistent attackers for higher security level, the number of times the on/off switching of the power source shall be increased.

SwitchPairing on Multiple Devices

Figure 10:
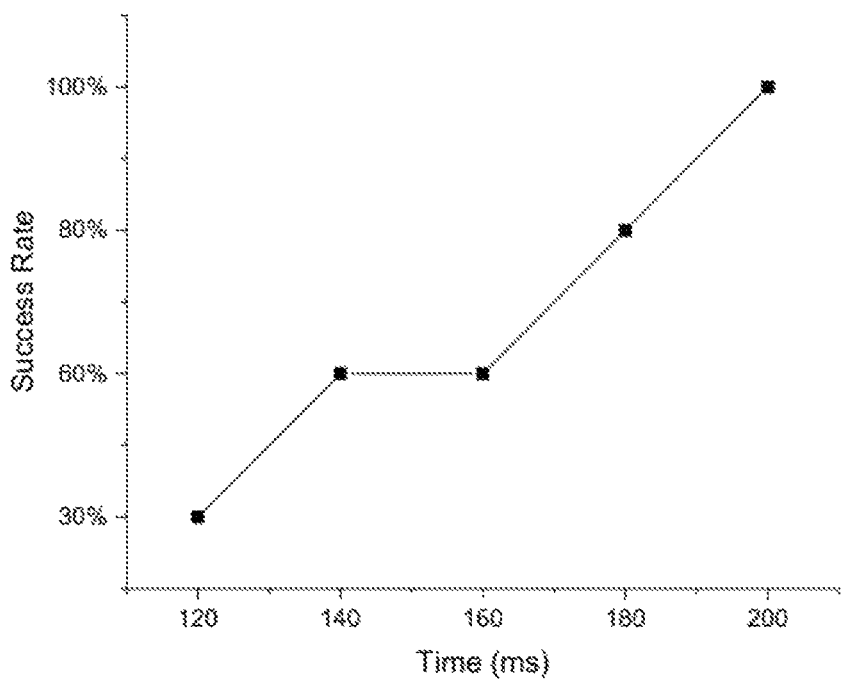
FIG. 10 shows a graph of success rate vs delay tolerance for pairing of multiple devices.

From the evaluation above, we know that SwitchPairing can achieve secure pairing on two devices. In this Section, we will demonstrate that the proposed SwitchPairing also works well on multiple devices. Specifically, three CC2640R2F boards were used, and each development board runs the SwitchPairing protocol as described in the present disclosure. All three development boards were connected to the same power source, and the power source switch" on/off" operation was performed 4 times. We set the delay tolerance as 120 ms, 140 ms, 160 ms, 180 ms, 200 ms respectively for each device. We ran the test for 10 times and evaluated the success rate under different delay tolerance. FIG. 10 shows the results. It can be observed that when the delay tolerance reaches 200 ms, the success rate reaches 100%. Although this delay tolerance is close to (actually below) the median reaction time of a human subject (i.e., 215 ms), it is still challenging for attackers to deploy the "peep" attacks, seeing that the success of the attack requires all attacking attempts are made correctly. Table 3 shows the impacts of fault tolerance on different delay tolerance values. It can be observed when the fault tolerance is increased to 25%, which refers to the protocol allowing 1 error to occur (¼=25%), the protocol has a good performance when pairing three devices. However, we also argue that there is a trade-off when SwitchPairing is used for pairing up multiple devices. Manufactures may need to configure the delay tolerance as well as fault tolerance carefully when they want to use the protocol discussed in the present disclosure on multiple devices. Moreover, seeing that delay is closely related to chips, manufactures may also enhance the success rate within a small delay tolerance by using a relatively better designed chip. Another natural solution for this issue is that the user may want to make sure that he is not under supervision by an attacker while preforming the pairing on multiple devices, to such a degree that the fault tolerance can be set to a higher value as well, leading to a higher success rate.

TABLE 3

The impact of fault tolerance' and delay tolerance (ms)

| Fault tolerance | Delay tolerance | | |
|---|---|---|---|
| | 120 | 140 | 160 |
| | Success rate | | |
| $\varphi = 25\%$ | 70% | 90% | 100% |
| $\varphi = 50\%$ | 100% | 100% | 100% |

Although the method of pairing devices according to the present disclosure requires user to perform on/off operation on the power source, the disclosed protocol has many advantages over the state of the art. The pairing protocol of the present disclosure does not require expensive auxiliary equipment/peripherals, which is suitable for the low-price devices such as a smart lamp. The pairing protocol of the present disclosure requires the attacker to have physical access of the victim device, which takes much more efforts for an attacker and thus the protocol is more secure.

The processor described in the above exemplary embodiments may include, but is not limited to, a processing apparatus such as a microprocessor (MCU, Microcontroller Unit) or a programmable logic device (FPGA, Field Programmable Gate Array). The memory device described in the above exemplary embodiments may be configured to store a software program and modules of an application, for example, program instructions or modules corresponding to the methods in the above exemplary embodiments. The processor runs the software program and modules stored in the memory device to implement various functional applications. The memory device may include a high-speed random access memory, and may also include a nonvolatile memory, for example, one or more magnetic storage devices, flash memories or other nonvolatile solid-state memories. In some examples, the memory device may further include memories remotely disposed relative to the processor, and these remote memories may be connected to the communication device through a network. Examples of the network include, but are not limited to, the Internet, an intranet, a local area network, a mobile communications network, or a combination thereof.

Those of ordinary skill in the art should understand that all or some of the steps in the method disclosed above as well as functional modules or units in the system and device disclosed above may be implemented as software, firmware, hardware, and appropriate combinations thereof. In a hardware implementation, the division between the functional modules or units mentioned in the above description does not necessarily correspond to the division of physical components. For example, a physical component may have more than one function, or one function or step may be performed by several physical components through collaboration. Some or all of the components may be implemented as software executed by a processor such as a digital signal processor or microprocessor, or implemented as hardware, or implemented as integrated circuits, such as application-specific integrated circuits. Such software may be distributed over a computer readable medium. The computer readable medium may include computer storage media (or non-temporary media) and communication media (or temporary media). As is well-known to those of ordinary skill in the art, the term "computer storage medium" includes volatile and non-volatile, removable and non-removable media implemented in any method or technology used to store information (such as computer readable instructions, data structures, program modules or other data). The computer readable medium includes, but is not limited to, a RAM, a ROM, an EEPROM, a flash memory or other memory technologies, a CD-ROM, a digital versatile disk (DVD) or other optical disk storage, magnetic cassettes, magnetic tapes, disk storage or other magnetic storage devices, or any other media that may be used to store desired information and accessible to computers. In addition, as is well-known to those of ordinary skill in the art, a communication medium usually includes computer-readable instructions, data structures, program modules, or other data in modulated data signals such as carriers or other transmission mechanisms, and may include any information delivery medium.

The above shows and describes the basic principles and main features of the present disclosure as well as the advantages of the present disclosure. The present disclosure is not limited by the above exemplary embodiments. Described in the above exemplary embodiments and the specification are merely the principles of the present disclosure. On the premise of not departing from the spirit and scope of the present disclosure, the present disclosure will have various changes and improvements, all of which fall within the scope of the present disclosure for which protection is sought.

What is claimed is:

1. A method for pairing a plurality of devices in an internet of things (IoT) system, the method comprising following steps:
   connecting power supplies of the plurality of devices to a same power source, wherein the plurality of devices includes an initiator device and a responder device;
   exchanging pairing features of the initiator device and the responder device with each other;
   synchronizing clocks of the initiator device and the responder device so that the clocks of the initiator device and the responder device start measuring time at a same initial time point t0;
   switching the power source off and on for a plurality of times n;
   through the clock of the initiator device, recording a plurality of initiator device time stamps $S(T)_i=\{T_1, T_2, T_3, \ldots T_n\}$ in the initiator device corresponding to time stamps when the initiator device switches off in response to switching off of the power source;
   through the clock of the responder device, recording a plurality of responder device time stamps $S(T)_r=\{T_1, T_2, T_3, \ldots T_n\}$ in the responder device corresponding to time stamps when the responder device switches off in response to switching off of the power source;
   exchanging the initiator device time stamps $S(T)_i$ with the responder device and the responder device time stamps S(T)r with the initiator device;
   performing the pairing of the initiator device and the responder device abased on each of the initiator device time stamps is within a predefined delay tolerance of a corresponding time stamp of the responder device time stamps, otherwise rejecting the pairing of the initiator device and the responder device.

2. The method of claim 1, wherein, the predefined delay tolerance τ is defined by formula $$\tau = tp_{com} = MAX\{tp_I, tp_R\};$$

wherein, $tp_{com}$ is a common time precision and is equal to maximum of a time precision of the initiator device $tp_I$ and a time precision of the responder device $tp_R$;
wherein, the time precision of the initiator device $tp_I$ is a delay between switching off of the power source and actual switching off of the initiator device and the time precision of the responder device $tp_R$ is a delay between switching off of the power source and actual switching off of the responder device.

3. The method of claim 1, wherein, the predefined delay tolerance is 120 ms.

4. The method of claim 1, wherein, n>4.

5. The method of claim 2, wherein, n>4.

6. The method of claim 1, wherein, a time interval between two consecutive operations of switching the power source off and on is 8 seconds.

7. The method of claim 1, wherein, a time interval between each two consecutive operations of switching the power source off and on is different.

8. The method of claim 7, wherein, the time interval between each two consecutive operations of switching the power source off and on is at least 8 seconds.

9. The method of claim 1, further comprising:
   sharing a public key $PK_I$ of the initiator device with the responder device through the initiator device and sharing a public key $PK_R$ of the responder device with the initiator device through the responder device;
   generating a random number $r_I$ in the initiator device and a random number $r_R$ in the responder device;
   defining an initiator commitment CI in the initiator device as $C_I = F(PK_R, PK_I, rp_I, S(T)_i)$;
   defining a responder commitment CR in the responder device as $CR = F(PKR, PK_I, r_R, S(T)_i)$;
   wherein, F(.) is a first hash function;
   wherein, the step of exchanging the initiator device time stamps $S(T)_i$, with the responder device and the responder device time stamps $S(T)_r$ with the initiator device comprises sharing the initiator commitment $C_I$ with the responder device and the responder commitment $C_R$ with the initiator device; and
   generating a same key by the initiator device and the responder device $$DH\ Key = DH(SK_A, PK_B)$$
$$= DH(SK_B, PK_A)$$

wherein $SK_A$ and $SK_B$ are the corresponding private keys of $PK_A$ and $PK_B$ respectively.

10. An internet of things (IoT) system, comprising:
a plurality of devices; a common power source and at least one processor;
power supplies of the plurality of devices are connected to the power source, wherein the plurality of devices include an initiator device and a responder device;
the initiator device and the responder device form an alternative communication channel through the power source;
the processor is configured to exchange pairing features of the initiator device and the responder device with each other;
the processor is configured to synchronize clocks of the initiator device and the responder device through the alternative communication channel so that the clocks of the initiator device and the responder device start measuring time at a same initial time point t0;

wherein, secure data is obtained by switching the power source off and on for a plurality of times n;

through the clock of the initiator device, the processor is configured to record a plurality of initiator device time stamps $S(T)_i=\{T_1, T_2, T_3, \ldots T_n\}$ in the initiator device corresponding to time stamps when the initiator device switches off in response to switching off of the power source;

through the clock of the responder device, the processor is configured to record a plurality of responder device time stamps $S(T)_r=\{T_1, T_2, T_3, \ldots T_n\}$ in the responder device corresponding to time stamps when the responder device switches off in response to switching off of the power source;

the processor is configured to exchange the initiator device time stamps $S(T)_i$ with the responder device and the responder device time stamps $S(T)_r$ with the initiator device;

the processor is configured for performing the pairing of the initiator device and the responder device based on each of the initiator device time stamps is within a predefined delay tolerance of a corresponding time stamp of the responder device time stamps, otherwise rejecting the pairing of the initiator device and the responder device.

11. The IoT system according to claim 10, wherein, the predefined delay tolerance $\tau$ is defined by formula $$\tau = tp_{com} = \text{MAX}\{tp_I, tp_R\};$$

wherein, $tp_{com}$ is a common time precision and is equal to maximum of a time precision of the initiator device $tp_I$ and a time precision of the responder device $tp_R$;

wherein, the time precision of the initiator device $tp_I$ is a delay between switching off of the power source and actual switching off of the initiator device and the time precision of the responder device $tp_R$ is a delay between switching off of the power source and actual switching off of the responder device.

12. The IoT system according to claim 11, wherein, n>4.

13. The IoT system according to claim 10, wherein, the predefined delay tolerance is 120 ms.

14. The IoT system according to claim 10, wherein, n>4.

15. The IoT system according to claim 10, wherein, a time interval between two consecutive operations of switching the power source off and on is 8 seconds.

16. The IoT system according to claim 10, wherein, a time interval between each two consecutive operations of switching the power source off and on is different.

17. The IoT system according to claim 16, wherein, the time interval between each two consecutive operations of switching the power source off and on is at least 8 seconds.

18. The IoT system according to claim 10, wherein, the processor is configured to execute following operations:

sharing a public key $PK_I$ of the initiator device with the responder device through the initiator device and sharing a public key $PK_R$ of the responder device with the initiator device through the responder device;

generating a random number $r_I$ in the initiator device and a random number $r_R$ in the responder device;

defining an initiator commitment $C_I$ in the initiator device as $C_I = F(PK_R, PK_I, r_I, S(T)_i)$;

defining a responder commitment $C_R$ in the responder device as $C_R = F(PK_R, PK_I, r_R, S(T)_r)$;

wherein, $F(.)$ is a first hash function;

wherein, the processor is configured for exchanging the initiator device time stamps $S(T)_i$, with the responder device and the responder device time stamps $S(T)_r$ with the initiator device comprises sharing the initiator commitment $C_I$ with the responder device and the responder commitment $C_R$ with the initiator device; and generating a same key by the initiator device and the responder device $$DH\ Key = DH(SK_A, PK_B)$$
$$= DH(SK_B, PK_A)$$

wherein $SK_A$ and $SK_B$ are the corresponding private keys of $PK_A$ and $PK_B$ respectively.

* * * * *